United States Patent

Bellon

(10) Patent No.: US 7,111,066 B2
(45) Date of Patent: Sep. 19, 2006

(54) METHOD OF OPERATING A STORAGE DEVICE

(75) Inventor: Mark D. Bellon, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 1015 days.

(21) Appl. No.: 10/107,618

(22) Filed: Mar. 27, 2002

(65) Prior Publication Data

US 2003/0187948 A1 Oct. 2, 2003

(51) Int. Cl.
G06F 15/16 (2006.01)
G06F 15/173 (2006.01)
G06F 13/12 (2006.01)
G06F 13/00 (2006.01)

(52) U.S. Cl. .................. 709/229; 709/201; 709/226; 710/74; 710/316

(58) Field of Classification Search .............. 709/201, 709/226, 229, 225; 710/1, 74, 316; 370/254, 370/381
See application file for complete search history.

(56) References Cited

U.S. PATENT DOCUMENTS

| | | | | |
|---|---|---|---|---|
| 5,941,994 A | * | 8/1999 | DeKoning et al. | 714/7 |
| 6,601,128 B1 | * | 7/2003 | Burton et al. | 710/316 |
| 6,745,341 B1 | * | 6/2004 | Onitsuka et al. | 714/7 |
| 6,775,686 B1 | * | 8/2004 | Bellon | 709/201 |
| 6,779,062 B1 | * | 8/2004 | Eschmann et al. | 710/74 |
| 6,912,576 B1 | * | 6/2005 | Rustagi et al. | 709/226 |
| 6,977,927 B1 | * | 12/2005 | Bates et al. | 370/381 |
| 2001/0020254 A1 | * | 9/2001 | Blumenau et al. | 709/229 |
| 2002/0026558 A1 | * | 2/2002 | Reuter et al. | 711/114 |
| 2002/0196744 A1 | * | 12/2002 | O'Connor | 370/254 |
| 2002/0199071 A1 | * | 12/2002 | Kitamura et al. | 711/152 |
| 2003/0126315 A1 | * | 7/2003 | Tan et al. | 710/1 |

* cited by examiner

Primary Examiner—Bunjob Jaroenchonwanit
Assistant Examiner—Ramsey Refai
(74) Attorney, Agent, or Firm—Kevin D. Wills

(57) ABSTRACT

A method of operating a storage device (220) on a multi-service platform module (102) within a multi-service platform system (100), includes initializing a first aggregation element (236) and a second aggregation element (238) on the multi-service platform module (102), where the first aggregation element (236) is coupled to route access to the storage device (220) between one of a first network (104) and a first transceiver socket (240), and where the second aggregation element (238) is coupled to route access to the storage device (220) between one of a second network (106) and a second transceiver socket (242). A controller (226) coupled to multi-service platform module (102) controls the first aggregation element (236) and the second aggregation element (238). A location (115) of the multi-service platform module (102) is communicated to a platform controller (108), and an address (227) of the storage device (220) is communicated to the platform controller (108). A storage device location (244) is determined within the multi-service platform system (100) utilizing the location (115) of the multi-service platform module (102) the address (227) of the storage device (220).

4 Claims, 7 Drawing Sheets

METHOD OF OPERATING A STORAGE DEVICE

RELATED APPLICATIONS

Related subject matter is disclosed in U.S. patent application entitled "Multi-Service Platform Module" having application no. 10/107,967 and filed on the same date herewith and assigned to the same assignee.

BACKGROUND OF THE INVENTION

In computer systems that handle large amounts of data, it is desirable to have redundancy in the data storage and processor systems. Prior art methods of accomplishing redundancy include the redundant array of independent disks (RAID) methodology. One of these methodologies is RAID 1, which essentially "mirrors" data on any given disk to another disk. This has the disadvantage of being expensive.

An implementation of the RAID concept is found in multi-service platform systems, which create an environment where any component, processor, storage media, etc. can be replaced (hot swapped) while maintaining the integrity of the system. Ideally, this system approaches 100% availability of data and 100% reliability as no single failure will bring down the entire system. However, multi-service platform systems have the disadvantage of having many components to support a dual network architecture, which makes maintenance difficult. When one of these components fail, it is difficult to locate the component (processor, storage device, etc.) in the vast array of boards found in the system. Also, controlling the access of the dual networks to the many devices requires extra processors and uses valuable network resources just to monitor and maintain the system. This detracts from network and processing resources available to support user applications and devices, while increasing costs for a given system capacity and performance.

Accordingly, there is a significant need for an apparatus and method that overcomes the deficiencies of the prior art outlined above.

BRIEF DESCRIPTION OF THE DRAWINGS

Referring to the drawing.

Figure 1:
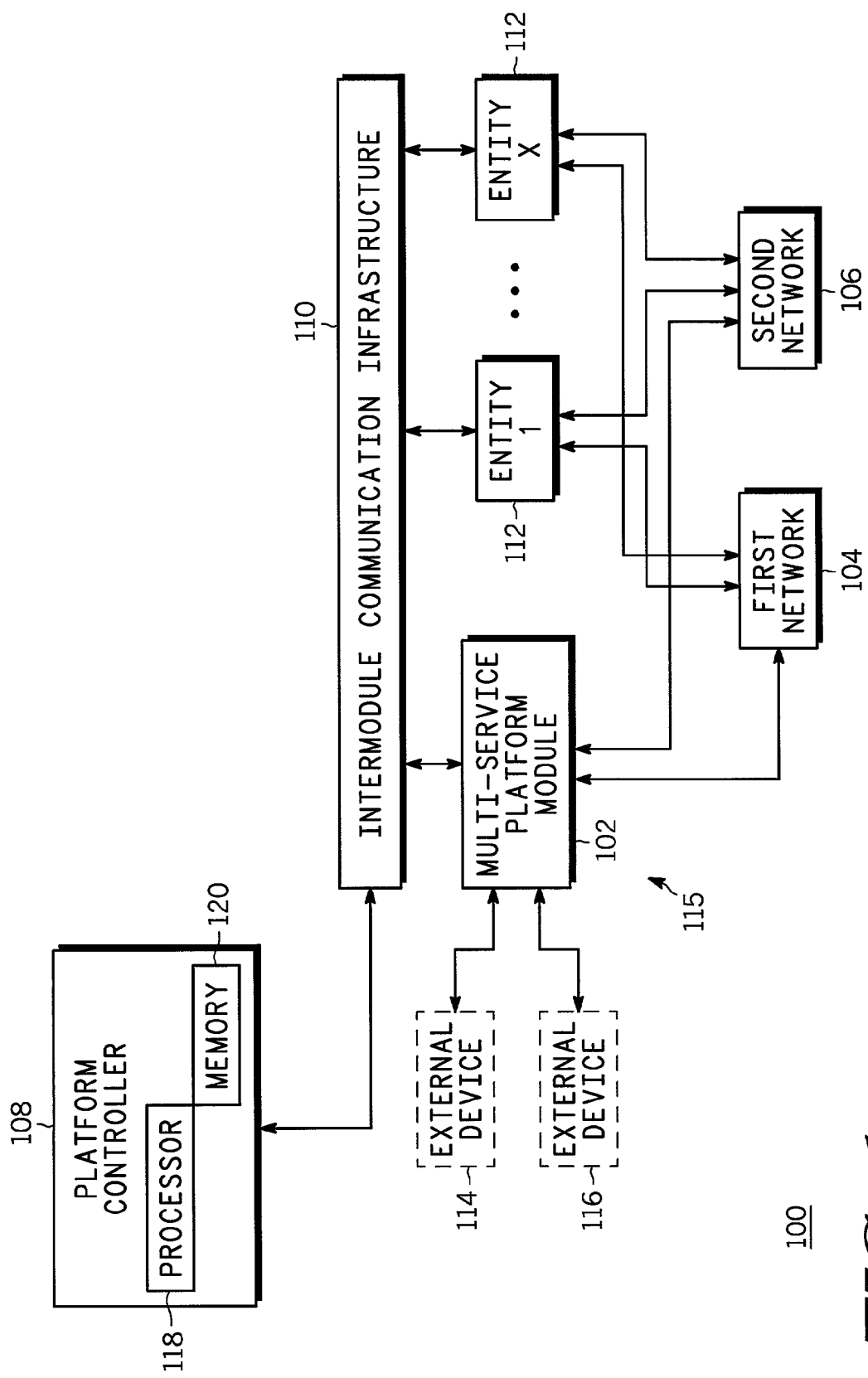
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which of illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact. However, "coupled" may also mean that two or more elements are not in direct contact with each other, but yet still co-operate or interact with each other.

For clarity of explanation, the illustrate embodiments of the present invention is presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. As shown in FIG. 1, a multi-service platform system 100 can include one or more computer chassis, with software and any number of slots. In one embodiment a backplane connector is used for connecting boards placed in the slots. As an example of an embodiment, a multi-service platform system can include model MXP3021 manufactured by Motorola Computer Group, 2900 South Diablo Way, Tempe, Ariz. 85282. The invention is not limited to this model or manufacturer and any multi-service platform is included within the scope of the invention.

Multi-service platform system 100 is controlled by a platform controller 108, which can include a processor 118 for processing algorithms stored in memory 120. Memory 120 comprises control algorithms, and can include, but is not limited to, random access memory (RAM), read only memory (ROM), flash memory, electrically erasable programmable ROM (EEPROM), and the like. Memory 120 can contain stored instructions, tables, data, and the like, to be utilized by processor 118. Platform controller 108 communicates with the various modules of multi-service platform system 100 via intermodule communication infrastructure 110, which can include, without limitation, multiredundant networks such as Ethernet, FibreChannel, and the like. Platform controller 108 also controls the functionality of multi-service platform system 100 including managing any modules placed in the slots of the chassis to add functionality to the multi-service platform system 100.

In the embodiment shown in FIG. 1, multi-service platform system 100 includes a multi-service platform module 102 that is coupled to and designed to operate with dual network architecture, which includes a first network 104 and a second network 106. First network 104 and second network 106 are high-speed serial data transfer networks that can be used to connect systems and data storage in point-to-point or switched topologies. First network 104 and second network 106 can be, for example and without limitation, FibreChannel networks, Infiniband networks, Serial ATA networks, and the like. Devices on multi-service platform module 102 are accessible to both first network 104 and second network 106, which are redundant networks in the multi-service platform system 100.

Any number of other entities 112 can also -operate on multi-service platform system 100, depending on slot availability, and are coupled to first network 104 and second network 106. Other entities 112 can access multi-service platform module 102 via at least one of first network 104 and second network 106.

Optionally, multi-service platform system 100 can be extended by plugging in one or more external devices 114,116 to multi-service platform module 102 (as shown in FIG. 1), or directly to either of the networks (not shown for clarity). This is discussed further below.

In one embodiment, multi-service platform module 102 is placed in a chassis slot in multi-service platform system 100. The location 115 of multi-service platform module 102 within multi-service platform system 100, and within which chassis if more than one chassis is included, is detected by platform controller 108 through intermodule communication infrastructure 110.

Figure 2:
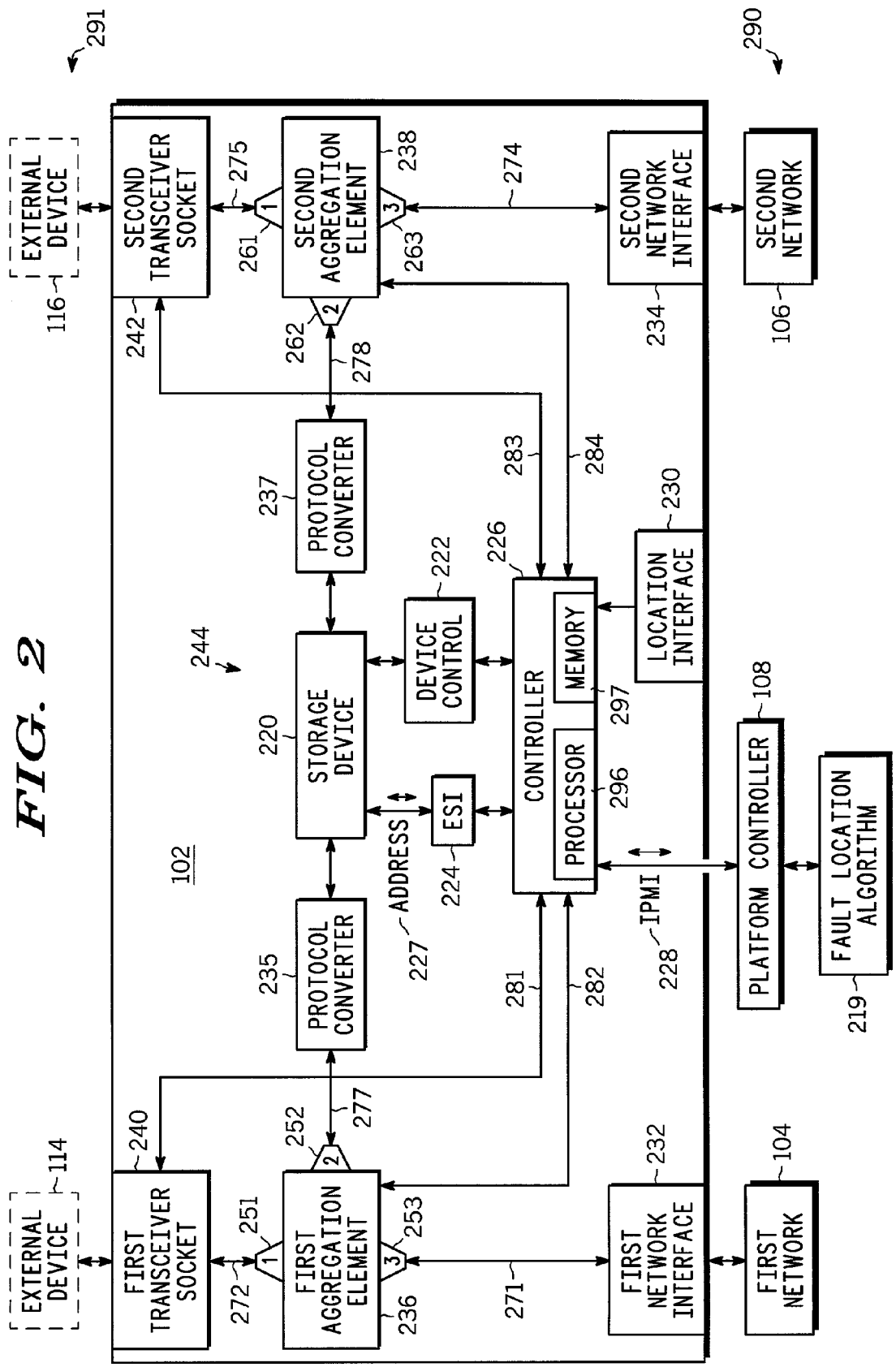
FIG. 2 depicts a multi-service platform module according to one embodiment of the invention.

FIG. 2 depicts a multi-service platform module 102 according to one embodiment of the invention. As shown in FIG. 2, multi-service platform module 102 includes storage device 220 which can be a dual-ported storage element. Multi-service platform module 102 can include, for example and without limitation, a FibreChannel storage device, an Infiniband storage device, a Serial ATA storage device, and the like. Storage device 220 can include any hardware or software capable of storing content, including a disk drive, flash memory, and the like. In a preferred embodiment, storage device 220 is a FibreChannel disk drive.

Storage device 220 is coupled to enclosure services interface 224 (ESI), which provides direct access to storage device 220 by platform controller 108 without use of first network 104 or second network 106. In an embodiment of the invention, ESI 224 is ESI 8067 if storage device 220 is a FibreChannel storage device. Storage device 220 is also coupled to device control 222, which contains, among other things, power control and fault signal interface for storage device 220.

Controller 226 is coupled to ESI 224 and device control 222 and is designed to control multi-service platform module 102. Controller 226 is coupled to platform controller 108 through the backplane 290. In one embodiment, controller 226 communicates with platform controller 108 utilizing an intelligent platform management interface (IPMI) standard 228. Controller is also designed to monitor the status of, and control first aggregation element 236 and second aggregation element 238. Controller can include a processor 296 for processing algorithms stored in memory 297. Memory 297 comprises control algorithms, and can include, but is not limited to, random access memory (RAM), read only memory (ROM), flash memory, electrically erasable programmable ROM (EEPROM), and the like. Memory 297 can contain stored instructions, tables, data, and the like, to be utilized by processor 296. In an embodiment of the invention, controller 226 can be a QLogic ZirconPM processor and support the PCI Industrial Computer Manufacturers Group (PICMG) specification. This processor is not limiting of the invention and other controllers and supporting specifications are within the scope of the invention.

Storage device 220 is designed to communicate with, and simultaneously reside in, both first network 104 and second network 106. In one embodiment, first network 104, second network 106 and platform controller 108 interface with multi-service platform module 102 through a backplane 290 of multi-service platform system 100. First network 104 is coupled to first network interface 232 and second network 106 is coupled to second network interface 234 on multi-service platform module 102.

Multi-service platform module 102 is designed to interface with external devices 114, 116, which can be, for example, any devices designed to interface with first network 104 and second network 106 respectively. By interfacing external devices 114, 116 with multi-service platform module 102, multi-service platform system 100 can be extended. External devices 114, 116 can add additional functionality or use existing resources of multi-service platform system 100 and particularly, multi-service platform module 102 and storage device 220. As shown in FIG. 2, external device 114 interfaces with multi-service platform module 102 at a first transceiver socket 240 and external device 116 interfaces at second transceiver socket 242. In an embodiment of the invention, first transceiver socket 240 and second transceiver socket 242 are Small Formfactor Pluggable (SFP) transceiver sockets and can include, without limitation, optical connectors, fiber optic connections, copper connections, infra-red connections, and the like. In one embodiment, first transceiver socket 240 and second transceiver socket 242 are accessed via a front panel 291 of multi-service platform system 100 chassis. In one embodiment external devices 114, 116 are hot-swappable and provide transmit-failure and receive loss-of-signal status bits, and a transmit enable control bit to controller 226. First transceiver socket 240 is coupled to controller 226 via control link 281, and second transceiver socket 242 is coupled to controller 226 via control link 283. Control links carry data signals that are independent of first network 104 and second network 106.

Multi-service platform module 102 also includes first aggregation element 236 and second aggregation element 238. First aggregation element 236 is coupled to first transceiver socket 240 via a first port 251 and network data link 272, to protocol converter 235 via second port 252 and network data link 277, and to first network interface 232 via third port 253 and network data link 271. Network data links carry data signals from first network 104 and second network 106. Second aggregation element 238 is coupled to second transceiver socket 242 via a first port 261 and network data link 275, to protocol converter 237 via second port 262 and network data link 278, and to second network interface 234 via third port 263 and network data link 274.

First aggregation element 236 is designed to route access to storage device 220 between first network 104 and first transceiver socket 240 by connecting second port 252 to either first port 251 or third port 253. For example, for first network 104 to have access to storage device 220, second port 252 is connected to third port 253. For first transceiver socket 240, and hence external device 114, to have access to storage device 220, second port 252 is connected to first port 251.

Second aggregation element 238 is designed to route access to storage device 220 between second network 106 and second transceiver socket 242 by connecting second port 262 to either first port 261 or third port 263. For example, for second network 106 to have access to storage device 220, second port 262 is connected to third port 263. For second transceiver socket 242, and hence external device 116, to have access to storage device 220, second port 262 is connected to first port 261.

Protocol converters 235, 237 are designed to convert data from one protocol to another. For example and without limitation, if storage device 220 is designed for one type of protocol (i.e. FibreChannel, Infiniband, Serial ATA, and the like) and first network 104 and second network 106 operate on a different protocol than storage device 220, data traveling between storage device 220 and the networks would have to be converted between protocols. If storage device 220 and first network 104 and second network 106 all operate on the same protocol, then protocol converters 235, 237 would be unnecessary.

First aggregation element 236 is coupled to route access to storage device 220 between one of first network 104 and first transceiver socket 240 based on commands from controller 226 via control link 282. Second aggregation element 238 is coupled to route access to storage device 220 between one of second network 106 and second transceiver socket 242 based on commands from controller 226 via control link 284. In effect, controller 226 is designed to control first aggregation element 236 and second aggregation element 238. In an example of an embodiment of the invention, where first network 104 and second network 106 are Fibre-Channel networks, first aggregation element 236 and second aggregation element 238 are FibreChannel hubs.

In an embodiment of the invention, controller 226 controls first aggregation element 236 based on whether first transceiver socket 240 is populated or unpopulated. First transceiver socket 240 is populated when external device 114 is connected and unpopulated with no external device 114 is connected. As an example of an embodiment of controller 226 controlling first aggregation element 236, if first transceiver socket 240 is populated, controller 226 configures first aggregation element 236 to inhibit access of first network 104 to the storage device 220 and allow access of first transceiver socket 240 to storage device 220. If the first transceiver socket 240 is unpopulated controller 226 configures first aggregation element 236 to inhibit access of first transceiver socket 240 to storage device 220 and allow access of first network 104 to the storage device 220.

In an embodiment of the invention, controller 226 controls second aggregation element 238 based on whether second transceiver socket 242 is populated or unpopulated. Second transceiver socket 242 is populated when external device 116 is connected and unpopulated with no external device 116 is connected. As an example of an embodiment of controller 226 controlling second aggregation element 238, if the second transceiver socket 242 is populated controller 226 configures second aggregation element 238 to inhibit access of second network 106 to storage device 220 and allow access of second transceiver socket 242 to storage device 220. If the second transceiver socket 242 is unpopulated controller 226 configures second aggregation element 238 to inhibit access of second transceiver socket 242 to storage device 220 and allow access of second network 106 to the storage device 220.

Controller 226 is coupled to location interface 230, which communicates the location 115 of multi-service platform module 102 within multi-service platform system 100 to platform controller 108. Location interface 230 can be, for example, module slot identification pins. When multi-service platform module 102 is placed in a slot in multi-service platform system 100, location interface 230 communicates the location 115 of multi-service platform module 102 to platform controller 108 via controller 226. As such, platform controller 108 then knows that a specific type of multi-service platform module 102 is located in a particular slot of multi-service platform system 100. For example, multi-service platform module 102 can be a processor module, FibreChannel Disk Module (FCDM), C-5 network processor module, and the like.

Although the location of multi-service platform module 102 is communicated to platform controller 108 via location interface 230 and controller 226, it is also desirable to have platform controller 108 know which storage device 220 is on which multi-service platform module 102. It is therefore desirable to have platform controller 108 map storage device 220 to multi-service platform module 102. Then each storage device 220 is associated with a multi-service platform module 102. This has numerous advantages. First, any fault conditions, errors, malfunctions, and the like of storage device 220 can be traced to so that the storage device location 244 can be easily traced via fault location algorithm 219. Another advantage is that any fault conditions, errors, malfunctions, and the like of storage device 220 can be reported via fault location algorithm 219. It is also desirable and cost effective that mapping storage device 220 to a multi-service platform module 102 occurs independent of first network 104 and second network 106.

In an embodiment of the invention, ESI 224 can be used to obtain an address 227 of storage device 220. As an example, an address 227 of storage device can be unique string of characters or numbers. In one embodiment, address 227 of storage device is FibreChannel World Wide Name (WWN), which is a 64 bit number unique to storage device 220. ESI 224 communicates address 227 of storage device 220 to platform controller 108 independent of first network 104 and second network 106 via controller 226. In one embodiment, communication of address 227 occurs using the IPMI standard 228. Since platform controller 108 knows the location 115 of multi-service platform module 102, and the address 227 of storage device 220 on that multi-service platform module 102, storage device location 244 within multi-service platform system 100 is known. In other words, location 115 of multi-service platform module 102 and address 227 of the storage device 220 determine storage device location 244 within the multi-service platform system 100. In one embodiment, storage device location 244 is mapped by platform controller and stored in memory 120.

Fault location algorithm 219 can include hardware and software to determine storage device location 244 and to notify proper personal, such as a system administrator, of a storage device fault or error so that remedial action can be taken. For example, fault location algorithm 219 can include software to access the mapped storage device location 244 at platform controller 108 in the event of a fault or error. Also, fault location algorithm 219 can notify a system administrator of problems with storage device 220. Notification can occur, for example and without limitation, through wireless means, wireline means, lighting up an LED indicator, pager, telephone, email, and the like.

Figure 3:
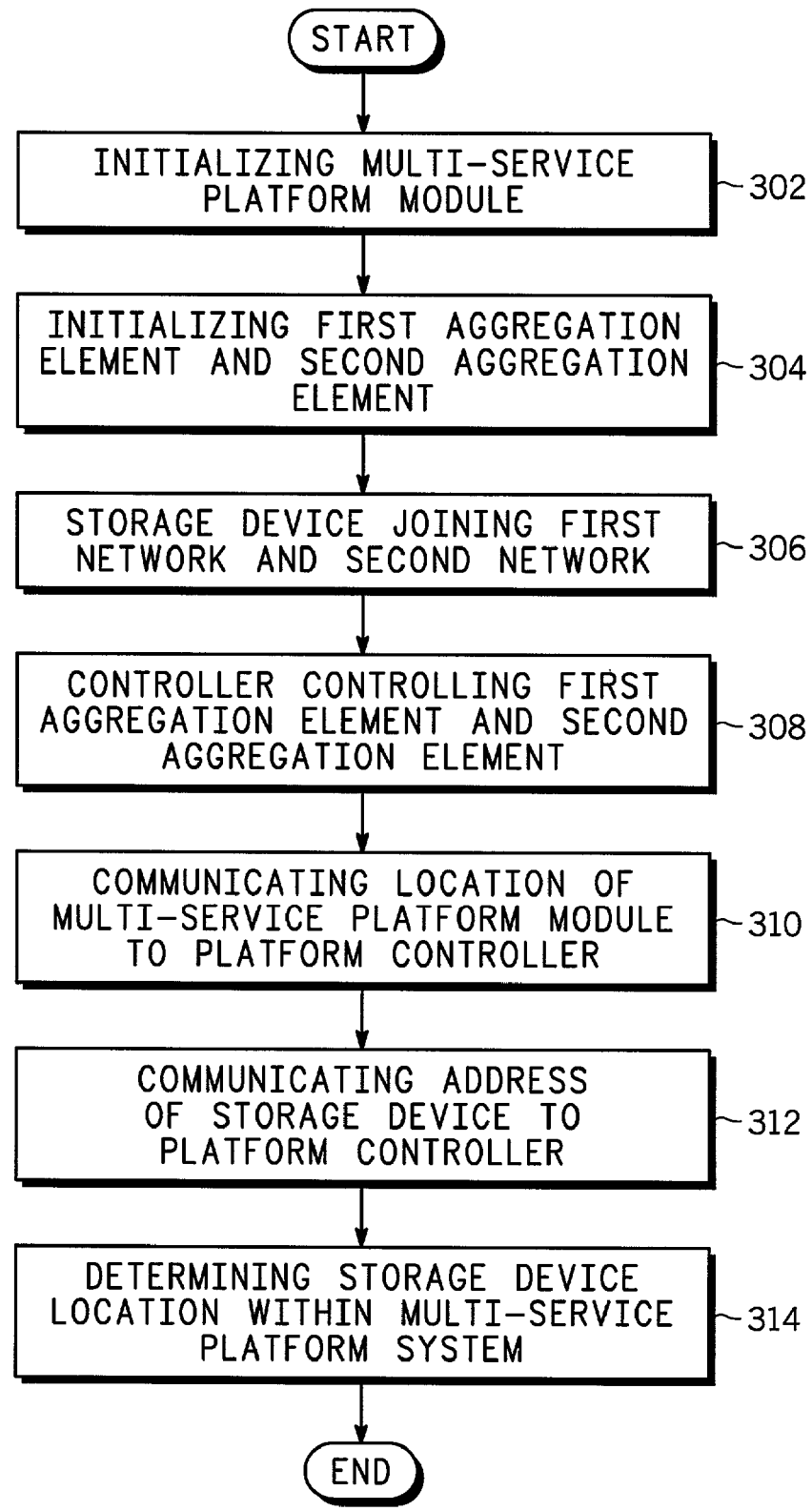
FIG. 3 illustrates a flow diagram of a method of the invention according to an embodiment of the invention.

FIG. 3 illustrates a flow diagram 300 of a method of the invention according to an embodiment of the invention. In step 302, multi-service platform module 102 is initialized. This can be accomplished by inserting multi-service platform module 102 into multi-service platform system 100, for example into a slot, or powering up multi-service platform module 102, and the like. In step 304, first aggregation element 236 and second aggregation element 238 are initialized by controller 226. Once initialized, first aggregation element 236 is coupled to route access to storage device 220 between one of first network 104 and first transceiver socket 240. Analogously, once initialized, second aggregation element 238 is coupled to route access to storage device 220 between one of second network 106 and second transceiver socket 242. In step 306, storage device 220 joins first network 104 and second network 106. In this manner, storage device 220 is recognized by first network 104 and second network 106 and any other entities 112 in multi-service platform system 100. Once joined, storage device 220 resides in first network 104 and second network 106 can be accessed by at least one other entity 112 in multi-service platform system 100. In step 308, controller 226 controls first aggregation element 236 and second aggregation element 238 as described above and more fully in relation to FIGS. 4 and 5.

In step 310, location 115 of multi-service platform module 102 is communicated to platform controller 108. Location 115 is determined by location interface 230 on multi-service platform module 102 and communicated to platform controller 108 via controller 226. In one embodiment, communication of location 115 is accomplished using an IPMI standard 228. In step 312, address 227 of storage device 220 is communicated to platform controller 108. Address 227 can be communicated using ESI 224 and is communicated independent of first network 104 and second network 106. In step 314, storage device location 244 within multi-service platform system 100 is determined using location 115 of multi-service platform module 102 and address 227 of storage device 220. Since the physical location of multi-service platform module 102 is known via location 115 and the address 227 of storage device 220 is known, address 227 can be mapped to location 115 to determine storage device location 244 in multi-service platform system 100. Storage device location 244 can be the actual physical location of storage device 220 in multi-service platform system 100.

Figure 4:
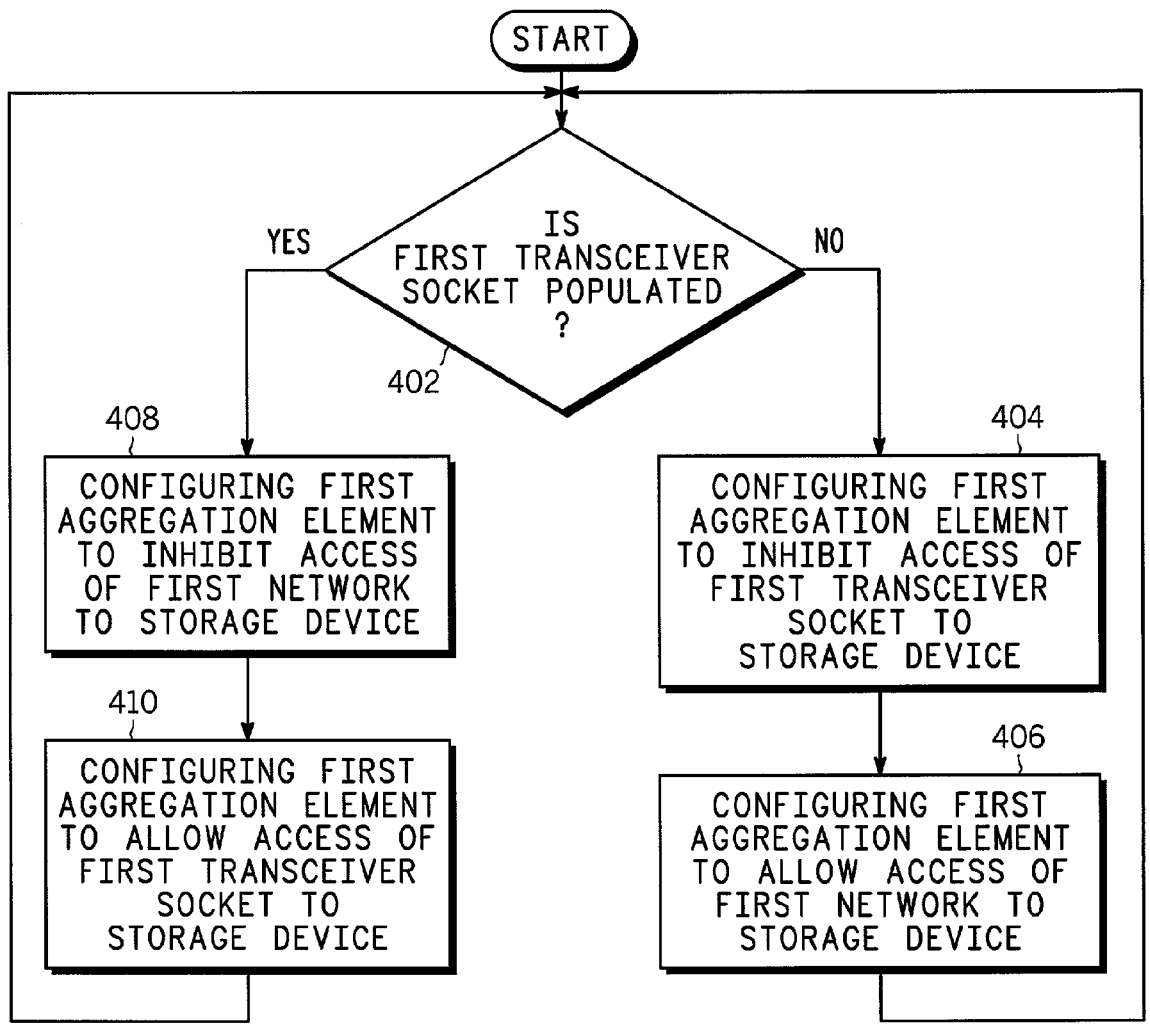
FIG. 4 illustrates a flow diagram of a method of controlling a first aggregation element according an embodiment of the invention.

FIG. 4 illustrates a flow diagram 400 of a method of controlling a first aggregation element 236 according an embodiment of the invention. In step 402 it is determined if first transceiver socket 240 is populated. First transceiver socket 240 can be populated by an external device 114. If first transceiver socket 240 is populated, controller 226 configures first aggregation element 236 to inhibit access of first network 104 to storage device 220 per step 408. Controller 226 also allows access of first transceiver socket 240 to storage device 220 per step 410. In an embodiment of the invention, controller 226 can configure first aggregation element 236 as described above by enabling a connection between first port 251 and second port 252, and disabling a connection between second port 252 and third port 253 of first aggregation element 236.

If first transceiver socket 240 is unpopulated per step 402, controller 226 configures first aggregation element 236 to inhibit access of first transceiver socket 240 to storage device 220 per step 404. Controller 226 also allows access of first network 104 to storage device 220 per step 406. In an embodiment of the invention, controller 226 can configure first aggregation element 236 as described above by enabling a connection between second port 252 and third port 253 and disabling a connection between first port 251 and second port 252 of first aggregation element 236. Controller 226 can continuously monitor whether first transceiver socket 240 is populated via control link 281 and configure first aggregation element 236 accordingly via control link 282. This is shown in FIG. 4 by the return arrows to step 402 from steps 406 and 410 respectively.

Figure 5:
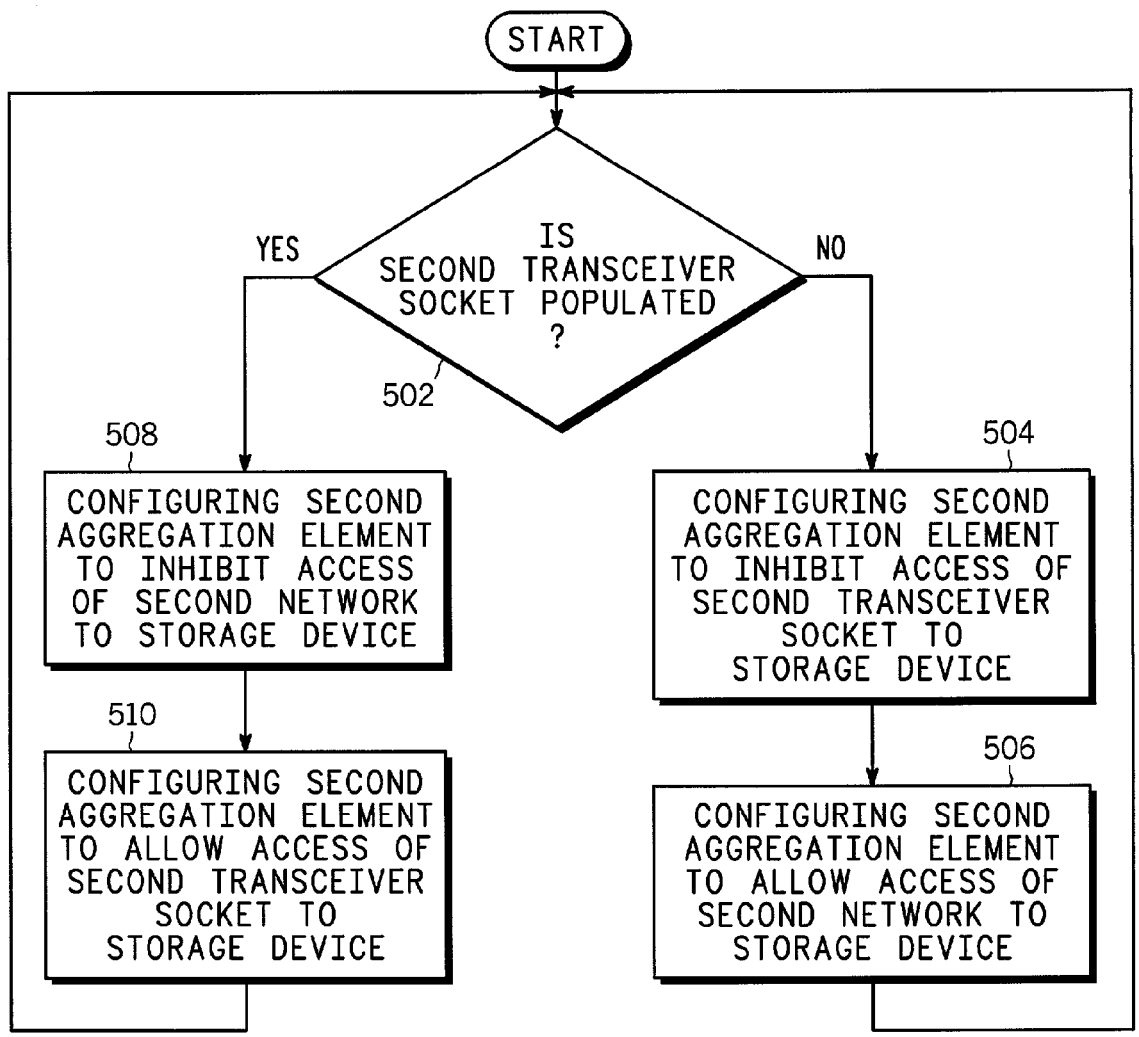
FIG. 5 illustrates a flow diagram of a method of controlling a second aggregation element according an embodiment of the invention.

FIG. 5 illustrates a flow diagram 500 of a method of controlling a second aggregation element 238 according an embodiment of the invention. In step 502 it is determined if second transceiver socket 242 is populated. Second transceiver socket 242 can be populated by an external device 116. If second transceiver socket 242 is populated, controller 226 configures second aggregation element 238 to inhibit access of second network 106 to storage device 220 per step 508. Controller 226 also allows access of second transceiver socket 242 to storage device 220 per step 510. In an embodiment of the invention, controller 226 can configure second aggregation element 238 as described above by enabling a connection between first port 261 and second port 262, and disabling a connection between second port 262 and third port 263 of second aggregation element 238.

If second transceiver socket 242 is unpopulated per step 502, controller 226 configures second aggregation element 238 to inhibit access of second transceiver socket 242 to storage device 220 per step 504. Controller 226 also allows access of second network 106 to storage device 220 per step 506. In an embodiment of the invention, controller 226 can configure second aggregation element 238 as described above by enabling a connection between second port 262 and third port 263, and disabling a connection between first port 261 and second port 262 of second aggregation element 238. Controller 226 can continuously monitor whether second transceiver socket 242 is populated via control link 283 and configure second aggregation element 238 accordingly via control link 284. This is shown in FIG. 5 by the return arrows to step 502 from steps 506 and 510 respectively.

Figure 6:
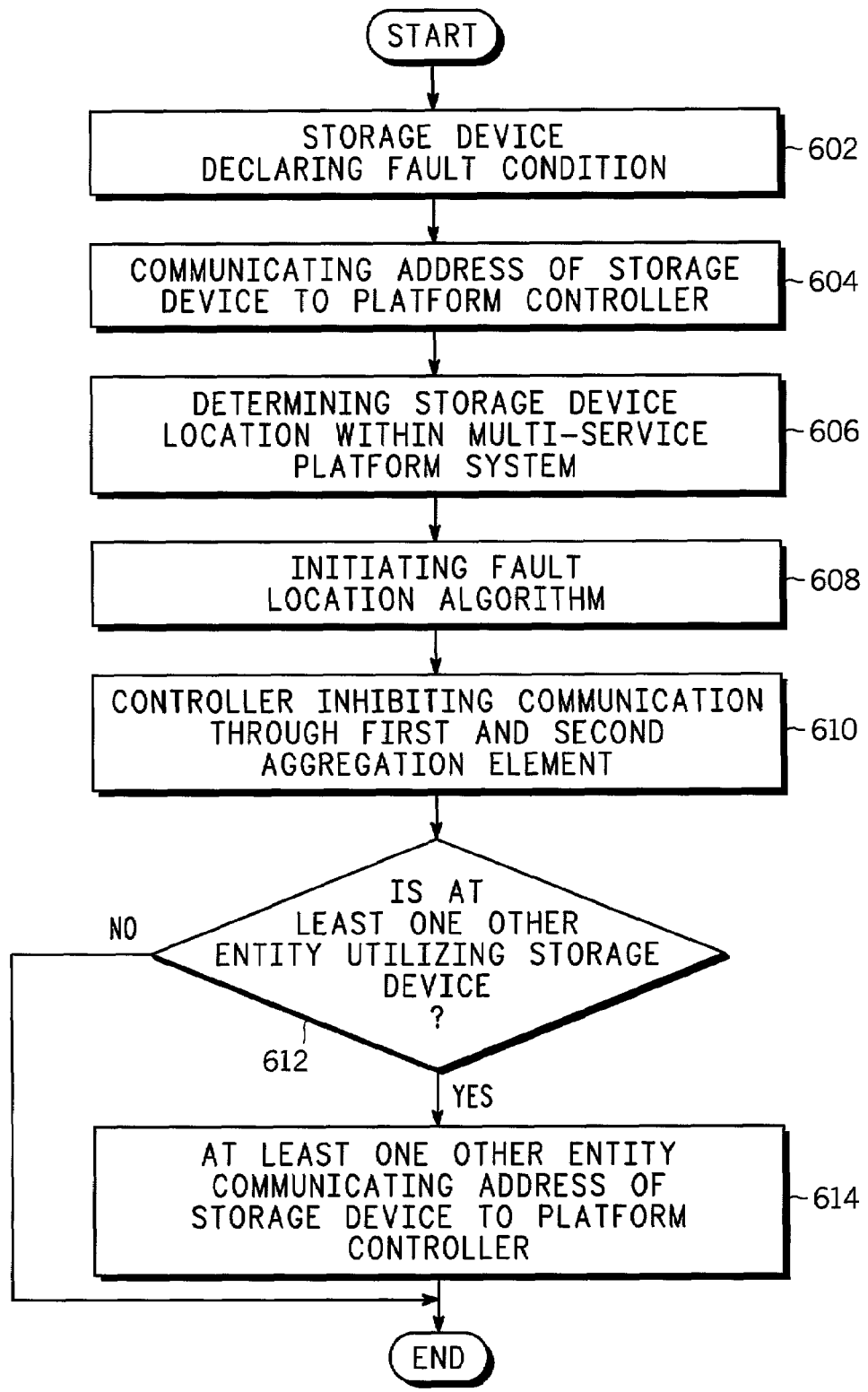
FIG. 6 illustrates a flow diagram of a method of the invention according to an embodiment of the invention.

FIG. 6 illustrates a flow diagram 600 of a method of the invention according to an embodiment of the invention. In step 602, storage device 220 declares a fault condition, where a fault condition can include, but is not limited to, mechanical malfunction of storage device 220, disk read error, software malfunction of storage device 220, and the like. The fault condition is communicated to controller 226 via ESI 224 on multi-service platform module 102. In step 604, controller 226 communicates address 227 of storage device 220 that is reporting a fault condition to the platform controller 108, independent of first network 104 and second network 106.

In step 606, platform controller 108 determines storage device location 244 within multi-service platform system 100 by looking up address 227 and correlating with location 115, both of which were communicated to platform controller 108 upon multi-service platform module 102 initialization. Platform controller 108 then initiates fault location algorithm 219 per step 608. In step 610 controller 226 inhibits communication through first aggregation element 236 and second aggregation element 238 to preclude access to storage device 220 by at least one other entity 112 via first network 104 and second network 106. In effect, storage device 220 is removed from first network 104 and second network 106.

In step 612 it is determined if at least one other entity is utilizing storage device 220 during the fault condition. If so, at least one other entity 112 is unable to communicate with storage device 220 during the fault condition, and will communicate address 227 of storage device 220 to platform controller 108 per step 614. In one embodiment, platform controller 108 has already received address 227 from controller 226 and discards the notice of address 227 received from at least one other entity 112. In another embodiment, address 227 must be received from both controller 226 and at least one other entity 112 in order for fault location algorithm 219 to be initiated.

Figure 7:
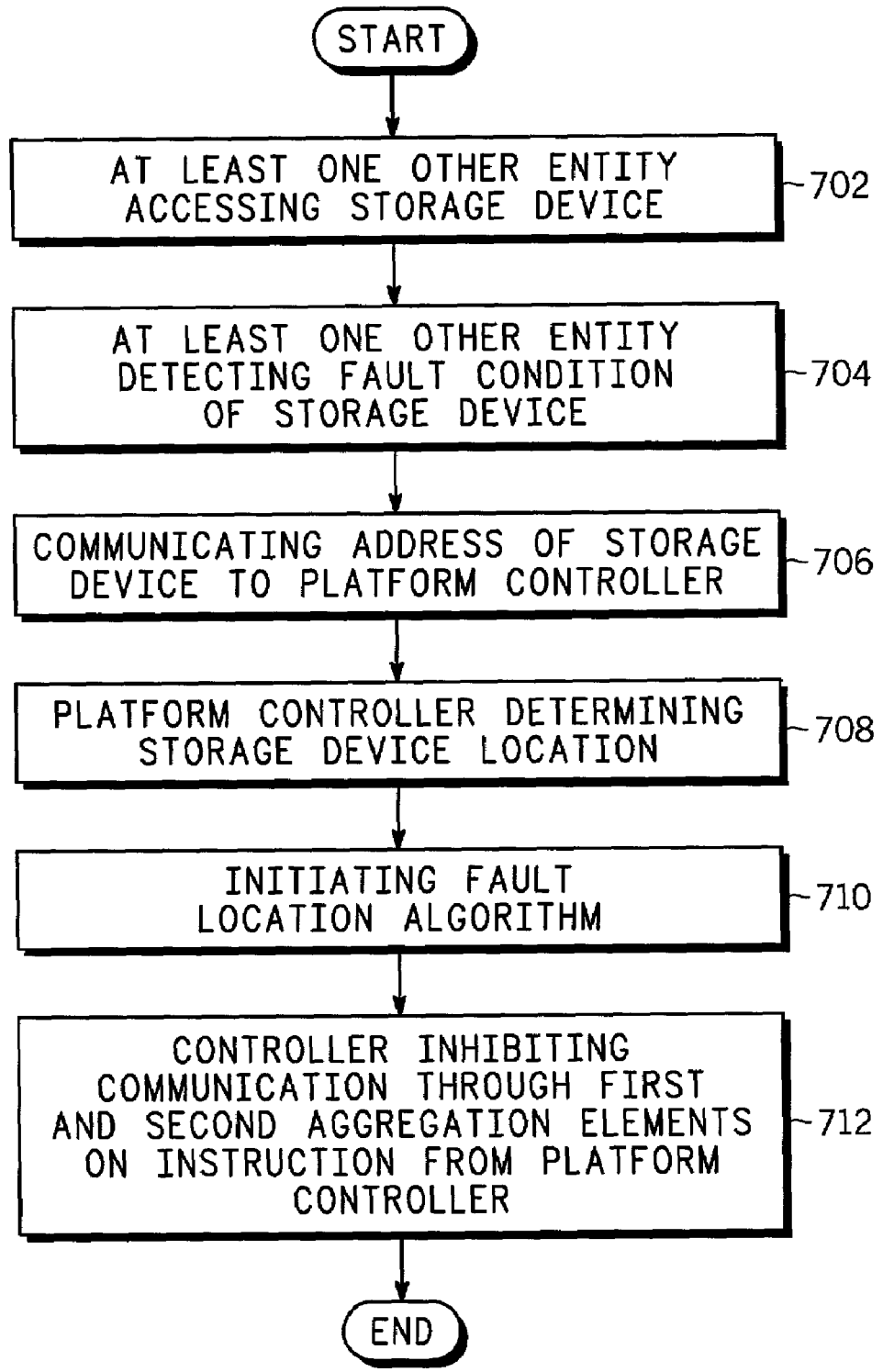
FIG. 7 illustrates a flow diagram of a method of the invention according to another embodiment of the invention.

FIG. 7 illustrates a flow diagram 700 of a method of the invention according to another embodiment of the invention. In step 702, at least one other entity 112 is accessing storage device 220. In step 704, at least one other entity 112 detects a fault condition of storage device 220. In this instance, storage device 220 did not report a fault condition, instead at least one other entity 112 detects the fault condition. At least one other entity 112 can detect a fault condition by, for example and without limitation, being unable to access storage device 220, and the like. In step 706 at least one other entity 112 also communicates address 227 of storage device 220 to platform controller 108. In step 708, platform controller 108 determines storage device location 244 within multi-service platform system 100 by looking up address 227 received from at least one other entity 112 and correlating with location 115, both of which were communicated to platform controller 108 upon multi-service platform module 102 initialization. Platform controller 108 then initiates fault location algorithm 219 per step 710. In step 712, controller 226 inhibits communication through first aggregation element 236 and second aggregation element 238 on instructions from platform controller 108, to preclude access to storage device 220 by at least one other entity 112 via first network 104 and second network 106.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A method of operating a storage device on a multi-service platform module within a multi-service platform system, comprising:

initializing a first aggregation element and a second aggregation element on the multi-service platform module, wherein the first aggregation element is coupled to route access to the storage device between one of a first network and a first transceiver socket, and wherein the second aggregation element is adapted to route access to the storage device between one of a second network and a second transceiver socket;

controlling the first aggregation element and the second aggregation element;

communicating a location of the multi-service platform module to a platform controller;

the storage device declaring a fault condition;

communicating an address of the storage device to the platform controller, wherein the address is communicated independently of the first network and the second network: and the controller communicating the address of the storage device to the platform controller, wherein the address is communicated independently of the first network and the second network;

the platform controller utilizing the location of the multi-service platform module and the address of the storage device to determine the storage device location and initiate a fault location algorithm;

if at least one other entity from the multi-service platform system is utilizing the storage device during the fault condition, the controller inhibiting communication through the first aggregation element and the second aggregation element; and the at least one other entity from the multi-service platform system communicating the address of the storage device to the platform controller.

2. A method of operating a storage device on a multi-service platform module within a multi-service platform system, comprising:

initializing a first aggregation element and a second aggregation element on the multi-service platform module, wherein the first aggregation element is coupled to route access to the storage device between one of a first network and a first transceiver socket, and wherein the second aggregation element is adapted to route access to the storage device between one of a second network and a second transceiver socket;

controlling the first aggregation element and the second aggregation element;

communicating a location of the multi-service platform module to a platform controller;

communicating an address of the storage device to the platform controller, wherein the address is communicated independently of the first network and the second network;

at least one other entity from the multi-service platform system accessing the storage device via at least one of the first network and the second network;

the at least one other entity detecting a fault condition of the storage device;

the at least one other entity communicating the address of the storage device to the platform controller;

the platform controller utilizing the location of the multi-service platform module and the address of the storage device to determine the storage device location and initiate a fault location algorithm; and the controller inhibiting communication through the first aggregation element and the second aggregation element on instruction from the platform controller.

3. A computer-readable medium containing computer instructions for instructing a processor to perform a method of operating a storage device on a multi-service platform module within a multi-service platform system, the instructions comprising:

initializing a first aggregation element and a second aggregation element on the multi-service platform module, wherein the first aggregation element is coupled to route access to the storage device between one of a first network and a first transceiver socket, and wherein the second aggregation element is adapted to route access to the storage device between one of a second network and a second transceiver socket;

controlling the first aggregation element and the second aggregation element;

communicating a location of the multi-service platform module to a platform controller;

the storage device declaring a fault condition;

communicating an address of the storage device to the platform controller, wherein the address is communicated independently of the first network and the second network;

determining a storage device location within the multi-service platform system utilizing the location of the multi-service platform module and the address of the storage device;

if at least one other entity from the multi-service platform system is utilizing the storage device during the fault condition, the controller inhibiting communication through the first aggregation element and the second aggregation element; and the at least one other entity from the multi-service platform system communicating the address of the storage device to the platform controller.

4. A computer-readable medium containing computer instructions for instructing a processor to perform a method of operating a storage device on a multi-service platform module within a multi-service platform s tern the instructions comprising:

initializing a first aggregation element and a second aggregation element on the multi-service platform module, wherein the first aggregation element is coupled to route access to the storage device between one of a first network and a first transceiver socket, and wherein the second aggregation element is adapted to route access to the storage device between one of a second network and a second transceiver socket;

controlling the first aggregation element and the second aggregation element;

communicating a location of the multi-service platform module to a platform controller;

communicating an address of the storage device to the platform controller, wherein the address is communicated independently of the first network and the second network;

determining a storage device location within the multi-service platform system utilizing the location of the multi-service platform module and the address of the storage device at least one other entity from the multi-service platform system accessing the storage device via at least one of the first network and the second network;

the at least one other entity detecting a fault condition of the storage device;

the at least one other entity communicating the address of the storage device to the platform controller;

the platform controller utilizing the location of the multi-service platform module and the address of the storage device to determine the storage device location and initiate a fault location algorithm; and the controller inhibits communication through the first aggregation element and the second aggregation element on instruction from the platform controller.

* * * * *